United States Patent [19]

O'Connor et al.

[11] 3,749,362

[45] July 31, 1973

[54] FASTENER STRETCHER

[75] Inventors: Joseph W. O'Connor, Silver Spring; Victor C. Orem, Glen Burnie, both of Md.

[73] Assignee: The United States of America as represented by the Administrator of the National Aeronautics and Space Administration, Washington, D.C.

[22] Filed: Apr. 9, 1971

[21] Appl. No.: 132,849

[52] U.S. Cl. .............. 254/29 A, 81/57.38, 29/452
[51] Int. Cl. .......................................... B25b 21/00
[58] Field of Search ............... 29/452, 446, 244; 81/57.38, 54, 56; 254/29 A

[56] References Cited
UNITED STATES PATENTS

| | | | |
|---|---|---|---|
| 2,760,393 | 8/1956 | Stough | 81/57.38 |
| 2,866,370 | 12/1958 | Biach | 29/452 X |
| 2,885,919 | 5/1959 | Carlson | 29/452 X |
| 3,099,076 | 7/1963 | DeMart | 254/29 A |

Primary Examiner—Granville Y. Custer, Jr.
Assistant Examiner—J. C. Peters
Attorney—R. F. Kempf, Earl Levy and John R. Manning

[57] ABSTRACT

A fastener stretcher for applying a substantially pure axial tensile force to a structural bolt or similar fastening element, comprising a pair of telescoping elements one of which is temporarily secured to the bolt. By spreading the telescoping elements axially, the bolt is tensioned axially to permit a nut or the like to be threaded thereon with a minimum of torque; when the elements are then removed from the bolt, the axial forces on the bolt are taken up by the nut to retain the bolt in its stressed state.

8 Claims, 5 Drawing Figures

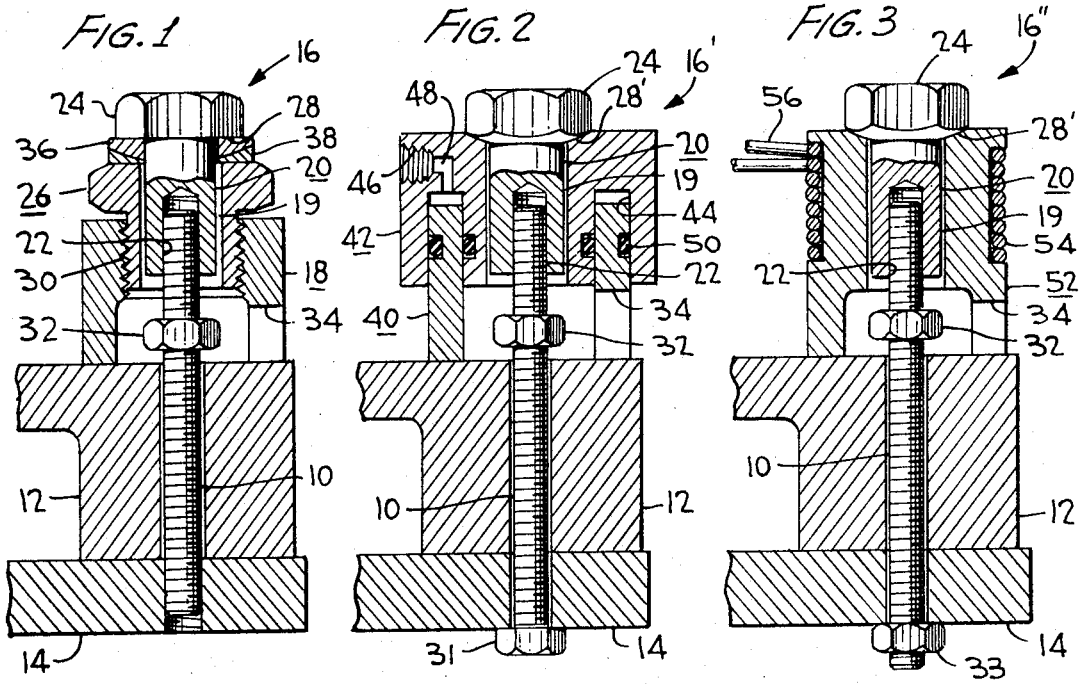
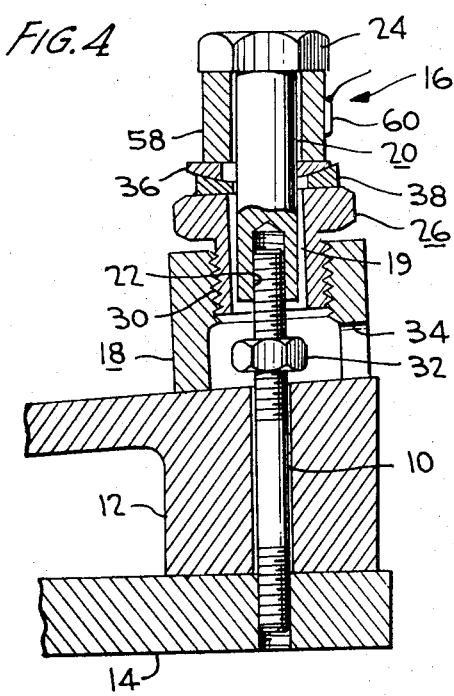
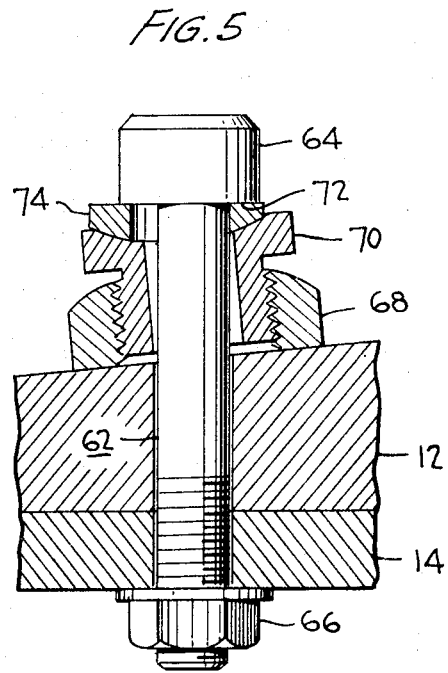
INVENTORS,
JOSEPH W. O'CONNOR
VICTOR C. OREM
BY
Earl Levy
ATTORNEYS

FASTENER STRETCHER

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

This invention relates generally to the field of securing together structural members by means of bolts and similar fastening members, and in particular relates to a device for applying an axial stretching force to a bolt or similar fastening member while a nut is hand-tightened thereon, to permit utilization of substantially the entire tensile strength of the bolt or other similar fastening member.

An extremely common method of securing together structural members, and finding utility in a wide range of technological applications, is by passing a bolt or similar securing member through an opening in two or more such structural member, which bolt may be headed at one end or have a nut at this end, threaded into one of the members, and then has a securing nut threaded onto its other end to retain the structural members secured together. It is well known, however, that when the securing nut is applied to the bolt in the conventional manner, either by the use of a wrench or other such tool, the load which can be applied to the bolt and hence to the structural members is limited in relation to the size of a bolt, inasmuch as, when a high torque load is applied directly to the nut threaded onto the bolt, only a very low percentage of the applied torque actually is transferred to the bolt as an axial tension. The remainder of the input torque is necessary to overcome friction between respective engaging threads of the nut and the bolt and between the surface of the nut and the structural member with which it is in contact when tightened. It is further well known that, if the input torque is made excessively high, in an attempt to increase the axial load upon the bolt, there is then the danger of stripping or damaging the threads on the nut and/or bolt, thus weakening the bolt and creating the danger of complete failure therof. In particular, it has been found that, in order to avoid damage to the bolt, actual axial force applied to the bolt can reach a value of only approximately 30 percent of the actual tensile strength of the bolt.

In order to prevent damage to the bolt in this manner, a common method of tightening the nut is through the use of a torque wrench or similar device which serves to apply a predetermined degree of torque on the nut. However, this method of tightening the nut only serves to insure that a predetermined degree of torque on the nut is not exceeded, and hence does not serve to increase the useful strength of the bolt.

In an attempt to overcome this drawback of known assembly methods, there have been proposed devices for applying substantially pure axial tension loads to the bolt, to thereby stretch the bolt before the nut is tightened, so that the load upon the bolt is increased by the amount of stretch or axial force applied to the bolt, thereby eliminating the need for excessive torque loads upon the nut. Such prior known devices have generally comprised a pair of telescoping sleeves which can be moved axially relative to each other, one of the sleeves being secured to the bolt while the other bears against the outer surface of the structural members, so that when the member secured to the head of the bolt is moved outwardly from the surface of the structural members, an axial tension force will be applied to the bolt. Such members, however, generally possess the distinct disadvantage that they must be retained in place on the bolt to exert a permanent axial force thereupon, and cannot be removed while the device is tensioned. This presents the obvious disadvantage that the resulting construction is quite bulky and requires the use of a non-reusable member for each such prestressed installation. Additionally, in many constructions, as exemplified by British Pat. No. 1,078,809, a movable sleeve member is secured to the upper end of the bolt or similar fastener member through the use of a threaded portion which engages a couter-bored threaded portion within the bolt. It should be appreciated, however, that such counter-boring of the bolt weakens or reduces its inherent tensile strength, and obviously additionally requres the step of counter-boring the bolt and internally threading this counter-bore to receive the threaded portion of the movable sleeve.

With the above background in mind, it is therefore a primary object of the present invention to provide a device for axially stretching a shaft, structural bolt, or similar member, in order to increase its useful tensile strength, thereby overcoming the above-mentioned drawbacks of the prior art.

Specifically, it is an object of the present invention to provide such a bolt stretching device which may be readily applied to any threaded and/or headed conventional bolt without modification of the bolt.

It is a further object of the present invention to provide such a device which has a minimum of structural elements, and which can be operated in a simple, reliable and precise manner.

It is yet a further object of the present invention to provide such a device which includes means for assuring that a substantially pure axial force is applied to the bolt regardless of irregularities in the surfaces of the structural members being assembled.

Still a further object of the present invention is to provide such a device which preferably may be removed from the assembly following tensioning of the bolt and tightening of a nut or other member thereupon.

SUMMARY OF THE INVENTION

These, as well as other objects which will become apparent as the description of the invention proceeds, are implemented by the inventive bolt stretcher for applying a substantially pure axial tensile force to a structural bolt or similar fastening element, comprising a pair of telescoping elements, one of which is temporarily secured to the end of the bolt. By spreading the telescoping elements axially, the bolt is tensioned axially to permit a nut or the like to be threaded thereon within a minimum of torque loads; when the elements are then removed from the bolt, the axial forces on the bolt are taken up by the bolt to retain the bolt in its stressed state. In a preferred embodiment of the invention, the stretcher comprises a pair of elements which are axially movable relative to each other through the use of axial threading therebeteen, one of said members being threaded onto the top of the bolt and the other of the members bearing against the exterior surface of the structural members being assembled.

BRIEF DESCRIPTION OF THE DRAWINGS

The invention itself will be better understood, and additional objects, features and advantages thereof will become apparent, from the following detailed description of a preferred embodiment and three alternative embodiments of the invention, taken in conjunction with the accompanying single sheet of drawing in which:

FIG. 1 is a longitudinal section through a preferred embodiment of the invention;

FIG. 2 is a section similar to FIG. 1, showing an alternative embodiment of the invention;

FIG. 3 is a section similar to FIGS. 1 and 2, showing yet a further alternative embodiment;

FIG. 4 is a sectional view of the embodiment of FIG. 1, showing the device in use on an inclined or irregular surface; and FIG. 5 is yet a further modification of the inventive device, showing its application to a headed bolt.

DETAILED DESCRIPTION OF THE INVENTION

Referring now to the drawings, and initially to FIG. 1, the inventive device is shown as being applied to a threaded bolt or stud 10 which is being utilized to secure together two sructural members 12 and 14. In generally conventional manner, the bolt or stud 10 extends downwardly through a suitable bore through the structural member 12, and is retained at its lower end in structural member 14, restrained against upward movement relative thereto, as for example by being threadedly received in an internally threaded bore in the structural member 14. Alternatively, any suitable alternative construction may be utilized for preventing upward movement of the bolt or stud 10 relative to the structural members 12 and 14, as for example, by extending the bolt 10 completely through the structural member 14 and applying a conventional nut or other fastening member at its lower end, or by utilizing a bolt which is headed at its lower end.

The inventive fastener stretcher, designated generally as 16, comprises a supporting means bearing against the upper surface of the structural member 12, identified as a supporting standoff collar 18; a lifter member 20, which has a body portion 19, having in its lower part a generally central, internally threaded bore 22 which is threaded onto the top of the bolt or other fastener 10, and which has a nut or the like 24 integral with its upper end, the nut 24 including a depending radial shoulder 28 and being engaged by a wrench or similar tool should it become necessary to prevent rotation of the lifter member 20; a stretcher member, designated as stretcher nut 26, which loosely surrounds the body portion 19 of the lifter member 20; and upper and lower washers 36 and 38, respectively, disposed between the depending radial shoulder 28 of the nut 24 of lifter member 20 and the upper shoulder of stretcher nut 26. The stretcher nut 26 includes a downwardly extending annular portion 30 which is externally threaded to cooperate with complementary internal threads on the upper portion of the standoff collar 18, whereby rotation of the stretcher nut 26 will effect axial movement thereof relative to the standoff collar 18.

It should be understood, that while upper and lower washers 36 and 38 are in the preferred embodiment, they may be omitted. In such a case, the upper surface of stretcher nut 26 bears against depending radial shoulder 28 of lifter nut 24. A detailed description of the configuration and function of upper and lower washers 36 and 38 will be presented hereinafter in connection with FIG. 4.

Specifically, it is noted that counter-clockwise rotation of the stretcher nut 26, while the lifter member 20 is retained against rotation, will effect upward axial movement of the stretcher nut 26 and hence of the lifter member 20 and the bolt 10 secured thereto.

In assembling the structural members 12 and 14 with the bolt 10, through the use of the inventive fastener stretcher 16, the structural members 12 and 14 and the bolt 10 are assembled in their illustrated position, and a conventional nut or lock nut 32 is threaded onto the upper end of the bolt 10 to the position illustrated, wherein it is just above the upper surface of structural member 12. Then, the fastener stretcher 16 is placed in position by threading the lifter member 20, via threaded bore 22, onto the upper end of the bolt 10.

Following this, the stretcher nut 26 is rotated in a counter-clockwise direction, while retaining nut 24 of the lifter member 20 against rotation, to thus effect upward movement of the stretcher nut 26 and the lifter member 20 relative to the standoff collar 18 and structural member 12, to thereby effect an upward axial tensioning of the bolt 10. While the bolt is in this tensioned state, the nut 32 may then be run down "finger-tight", i.e., until a light frictional engagement is encountered with the upper surface of the structural member 12. At this point, the fastener stretcher 16 is removed by first rotating stretcher nut 26 in a clockwise direction and then unthreading the lifter member 20 from the upper end of the bolt 10; and the nut 32, bearing against the upper surface of member 12, will then retain the bolt in this stressed condition after removal of the fastener stretcher 16.

Preferably, as will be described at a later point with particular reference to FIG. 4, upper and lower washers 36, 38 are provided to permit the longitudinal axis of the stretcher nut 26 and the lifter member 20 to be tilted relative to one another should the structural members have an inclined or irregular surface. The upper and lower washers 36 and 38 have therebetween cooperating complementary generally spherical surfaces preferably with such surfaces low in friction, which, as will be described in greater detail at a later point, permit shifting of these washers radially with respect to one another. By this preferred configuration, the fastener stretcher has more universal application.

As a further feature, the standoff collar 18 preferably includes at least one generally radially extending access opening 34 therethrough, to permit ready access to the nut 32, to thereby permit tightening of the nut 32 while the fastener stretcher 16 is in position on the bolt 10.

In FIG. 2 there is illustrated an alternative embodiment of the inventive fastener stretcher device (designed as 16'), generally similar to that shown in FIG. 1 but utilizing a fluid cylinder-and-piston arrangement for effecting upward movement of the lifter, and hence upward axial stretching of the bolt. In this embodiment, the lifter member 20, having an upper nut portion 24 substantially identical to that illustrated and described in conjunction with FIG. 1, is threaded onto the top of bolt 10 in the same manner as has been previously described. It is to be noted in this embodiment bolt 10 is shown as having a head 31. This should not be considered as limiting since the end of bolt 10 could be threaded into structural member 14 instead. In place of the standoff collar 18, however, there is included a generally annular upstanding standoff collar 40 which, in the same manner as described with reference to standoff collar 18 in FIG. 1, has its lower end bearing against the exterior surface of structural member 12. Also, instead of stretcher nut 26, there is included a stretcher head 42 having in its lower portion a generally annular recess or chamber 44 into which the upper portion of the standoff collar 40 is slidingly received; and it will thus be seen that the stretcher head 42 may be vertically slidable relative to the standoff collar 40. More particularly, it will be recognized that the standoff collar 40 and stretcher head 42 respectively define piston and cylinder means, the piston defined by standoff collar 40 being stationary while the cylinder defined by stretcher head 42 is vertically movable in the axial direction with stretcher head 42 moving vertically, nut 24 of the lifter 20 bears against the top of the stretcher head 42 and thus partakes of its vertical axial movement.

Means are provided for introducing fluid pressure into the upper end of the annular chamber 44 of the stretcher head 42, above the top of the standoff collar 40, such means preferably comprising the threaded inlet port 46 into which may be threaded the nozzle of any suitable pressurized fluid source, and which communicates through passage 48 with the top of the annular space or chamber 44. Thus, it will be seen that when fluid pressure is introduced from a source, not shown, through the inlet port 46 and passageway 48 into the top of the chamber 44, the stretcher head 42 will be forced upwardly, and, lifting member 20, being threadedly secured to the top of the bolt 10 and in communication with stretcher head 42 by depending radial shoulder 28' of nut 24, will thus apply an upward tensile force to the bolt 10. In the same manner as previously described with reference to FIG. 1, the nut 32 may then be finger-tightened down to the upper surface of structural member 12; and the fastener stretcher 16' may then be removed from the bolt 10, the bolt being retained in its stressed condition by the nut 32 bearing against the structural member 12.

Preferably, there are additionally provided a plurality of O-ring sealing members 50 disposed in suitable recesses between the walls of the standoff collar 40 and the chamber 44 of stretcher head 42, to prevent fluid leakage therebetween, preventing any substantial loss of fluid pressure and hence enhancing the efficiency of the fastener stretcher.

In FIG. 3, there is illustrated yet a further embodiment of the inventive fastener stretcher device (designated as 16"), in which heat-applying means are utilized to effect axial movement of the lifter member 20, thereby stretching the bolt 10, which in this instance is shown positioned by nut 33. It should be apparent that bolt 10 could equally as well be threaded directly to structural member 14. In this embodiment, a unitary stretcher block member 52, surrounds the lifter member 20 and bolt 10 and bears at its upper end against the nut 24 of the lifter member 20. It is constructed of a suitable material such that it exhibits considerable expansion at least in the axial direction upon the application of heat. Further, heating means are provided for applying heat to the stretcher block member 52, which heating means may advantageously comprise a plurality of turns of a heating induction coil 54, which coil surrounds the stretcher block member 52, preferably disposed in a suitable groove or recess around the periphery of the stretcher block member, and which is connected by means of leads 56 to any suitable source of electric current. Thus, when current is applied to the heating coil 54, via leads 56, the stretcher block 52 will be heated and expanded in its axial direction. Since the lower end of the stretcher block member 52 bears against the exterior surface of the structural member 1 and its upper end bears against nut portion 24 of lifter member 20, this axial expansion will cause the lifter member 20 to be moved upwardly, thus effecting an axially upward tension upon the bolt 10. In the same manner as previously described, the nut 32 may then be tightened, after which the fastener stretcher 16" may be removed from the bolt.

In the embodiments of FIGS. 2 and 3, washers may be provided in the same manner as upper and lower washers 36 and 38 of FIG. 1, in order to permit tilting movement of the lifter member and the supporting member relative to each other; however, preferably the depending radial shoulder 28' of the nut 24 of the lifter member 20 in each instance, and the upper surface of the stretcher head 42 in FIG. 2 and stretcher block member 52 in FIG. 3, are contoured to provide such spherical surfaces as integral parts of their respective members, in order to provide such tilting movement.

In FIG. 4, there is illustrated the manner in which the fastener stretcher 16 of FIG. 1, may be utilized in conjunction with the structural member 12 and 14 having inclined surfaces or irregular surfaces. For illustration, in this figure, the upper structural member 12 is shown as having a surface inclined downwardly towards the left, relative to the axis of the bolt 10. It will be seen that, under such conditions, the lower convex generally spherical surface of the upper washer 36 and the upper concave generally spherical surface of the cooperating lower washer 38 are complementary with each other and permit the lifter member 20 to remain coaxial with the bolt 10, while the stretcher nut 26 and standoff collar 18 are tilted towards the left relative to the axis of the bolt 10 and lifter 20, so that rotation of the stretcher nut 26 will still effect a substantially pure axial pull upon the bolt 10. While the upper and lower washers 36 and 38 are shown as comprising individual elements, these may, if desired, be formed as integral parts of the lifter nut 24 and stretcher nut 26, so that the spherical surfaces are formed integrally with such latter members.

Additionally, in FIG. 4, the lifter member 20 is shown as elongated to a greater extent than in FIG. 1, and a strain gauge collar 58 is shown as disposed between the upper washer 36 and the nut 24 of the lifter member 20. Upon this collar 58 is mounted a strain gauge 60, by means of which the amount of axial tensile stress upon the bolt 10 may be indicated and the bolt thus stressed to any predetermined desired degree. While the strain gauge is illustrated only in connection with FIG. 4, it is clear that such collar and strain gauge combination may readily be utilized in connection with any of the embodiments described.

In each of the embodiments of the inventive fastener stretcher described thus far, it will be appreciated that the lifter member 20 is threaded directly onto the upper end of the bolt 10, and thus it will be appreciated that there is no need to counter-bore or otherwise mutilate or alter the conventional bolt 10. Thus, it should be appreciated that no undesirable reduction of the tensile strength of the bolt 10 is effected, but instead, the useful range of the tensile strength of the bolt is considerably extended with respect to prior known arrangements. Additionally, since the fastener stretcher is secured only to the bolt, by means of the internally threaded portion 22 of the lifter 20, the entire fastener stretcher may readily be removed from the structural member 12 once the nut 32 has been tightened. This represents a considerable improvement over prior known constructions, which have generally required that at least a portion of the fastener stretcher remain in place following tightening of the nut or other fastener, in order to maintain the bolt or other fastener in its stressed condition. Thus, the fastener stretcher may be easily and readily re-used in any desired application, without the need for maintaining an extremely large stock of such fastener stretchers to allow for use of such fastener stretchers at each desired securing point. Further, for the same reason, the standoff collar 18 and stretcher nut 26 of FIGS. 1 and 4, the standoff collar 40 and stretcher member 42 of FIG. 2, and the stretcher block member 52 of FIG. 3 may represent standard stock items which may be utilized for any bolt to which it is desired to apply the fastener stretcher, only the lifter member 20 needing to be selected to fit the threading of the particular bolt in use. Thus, it should be appreciated that another considerable improvement has been achieved over the prior art, in that the need for a large stock of various different sizes of fastener stretchers has been eliminated, and there remains only a need for maintaining a stock of a variety of sizes of the lifter members 20.

Still a further improvement over the prior art, due to this utilization of substantially the entire usable tensile strength of the bolt 10, by stretching the bolt while fastening the nut 32, is that considerably smaller dimensions of bolts may be utilized for a given strength requirement in an individual assembly, in contrast to prior arrangements where comparatively larger bolts were required to achieve a given usable tensile strength. Thus, considerable economical savings can be effected in assemblies using this system.

Referring now to FIG. 5, there is shown yet a further embodiment of the invention, finding particular utility in stressing bolts or similar fastening elements which are headed at their free ends. In this embodiment, structural members 12 and 14 are secured together by a through bolt 62 which has a head 64 at its end extending from the structural members. Bolt 62 is retained against axial movement relative to the structural members at its other end by a conventional nut or the like 66 or by being threaded directly within structural member 14, the latter configuration not being shown in FIG. 5. In this embodiment, the fastener stretcher comprises a support nut member 68 - which support nut is threaded internally, bears against the exterior of the member 12 at its lower end, and may preferably comprise a conventional hex nut — and a lifter member 70, which is externally threaded to fit into the hex nut 68. For ease of illustration hex nut 68 and lifter member 70 are shown exaggerated in size, in FIG. 5, relative to the other elements. The lifter member 70, in the same manner as described with reference to the stretcher nut 26 of FIG. 1, preferably has an external configuration permitting it to be engaged by a wrench or other tool, and may have a hexagonal configuration in the same manner as a standard hex nut. In use, the upper end of the lifter member 70 bears against the depending radial shoulder 72 of the head 64 of bolt 62. While the top surface of the lifter member may bear directly against the shoulder 72, preferably there is provided a spacer washer 74 having a lower generally spherical surface, the lifter member 70 having an upper complementary generally spherical surface, to permit axial shifting of the elements for use on uneven surfaces, in the same manner as has been previously described in connection with FIG. 4.

It should therefore be appreciated that, when the lifter member 70 is rotated counter-clockwise or, alternatively, the hex nut 68 is rotated clockwise, the lifter member 70 will be moved axially upwardly, thus creating an upward tensile force upon the bolt 62. In this embodiment, since there is no nut retaining the bolt in stressed position relative to the structural member 12, it should be appreciated that the members 68, 70, and if provided, 74, remain in position following stressing of the bolt, in order to maintain the bolt in its stressed condition.

Thus, it should be apparent that the embodiments of FIGS. 1-4 previously described, and particularly that of FIG. 1, are somewhat preferable inasmuch as they permit removal of the fastener stretcher following tensioning of the bolt and tightening of the nut 32 securing the bolt in its stressed condition.

Through the provision of the fastener stretcher, as described above, it is considered apparent that all of the objects of the invention set forth at the outset to the specification have been successfully fulfilled. Further, though specific embodiments of the invention have been described and illustrated, it will be clear that variations of the details of construction may be made without departing from the true spirit and scope of the invention as defined in the appended claims.

What is claimed is:

1. A fastener stretcher for applying an axial tensile loading force to a fastener such as a shaft extending through and connecting a plurality of structural members, the fastener extending at one end from the members and being retained at its opposite end against axial movement relative to the members, said fasten stretcher comprising: supporting means adopted for bearing against an exterior surface of the structural members adjacent said one end of the fastener; fastener-engaging means adapted for being removably secured to said one end of the fastener; and an annular, hollow stretcher nut means loosely surrounding, generally concentric with, and carrying said fastener-engaging means, said stretcher nut means being threaded-ly mounted on said support means, having a generally spherical surface cooperating with a complementary generally spherical surface on said fastener-engaging means, and having an external configuration permitting rotation thereof by a suitable tool, rotation of said stretcher nut means effecting axial movement thereof relative to said support means and hence imparting axial movement to said fastener-engaging mean in the direction away from the exterior surface of the structural member to thereby impart an axial tensile force to the fastener.

2. A fastener stretcher as defined in claim 1, wherein said one end of the fastener is externally threaded, said fastener-engaging means having an internally threaded portion adapted to threadedly receive therein said one end of said fastener.

3. A fastener stretcher as defined in claim 2 wherein said supporting means comprises an annular standoff collar surrounding the fastener and supporting said stretcher nut means, said annular standoff collar having at least one generally radial access opening permitting tightening of a nut threaded on the fastener, the nut retaining the axial tensile force on the fastener when the fastener stretcher is removed from the fastener.

4. A fastener stretcher as defined in claim 1, further comprising: a pair of washers disposed axially between said stretcher nut means and said fastener-engaging means, each of said washers carrying one of said respective generally spherical surfaces and cooperating with the generally spherical surface of the other of said washers.

5. A fastener stretcher as defined in claim 4, further comprising a strain gauge collar disposed axially between said stretcher nut means and said fastener-engaging means; and a strain gauge mounted on said strain gauge collar for indicating the degree of axial tensioning of the fastener, whereby the fastener may be tensioned to a predetermined degree.

6. A fastener stretcher as defined in claim 4, wherein said one end of the fastener is externally threaded, said fastener-engaging means having an internally threaded portion adapted to threadedly receive therein said one end of said fastener.

7. A fastener stretcher as defined in claim 6 wherein said supporting means comprises an annular standoff collar surrounding the fastener and supporting said stretcher nut means, said annular standoff collar having at least one generally radial access opening permitting tightening of a nut threaded on the fastener, the nut retaining the axial tensile force on the fastener when the fastener stretcher is removed from the fastener.

8. A fastener stretcher as defined in claim 1, further comprising a strain gauge collar disposed axially with respect to said stretcher nut means and said fastener-engaging means; and a strain gauge mounted on said strain gauge collar for indicating the degree of axial tensioning of the fastener, whereby the fastener may be tensioned to a predetermined degree.

* * * * *